April 24, 1934.   A. J. DIESCHER   1,956,010
DOUBLE ACTING CHECK VALVE
Filed March 12, 1932   2 Sheets-Sheet 1
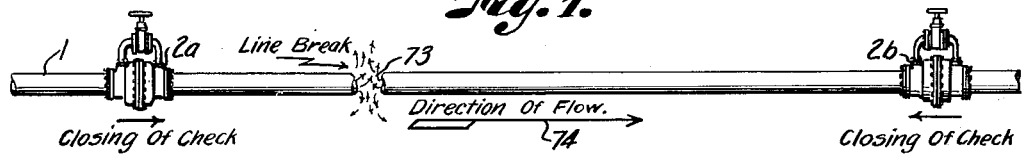
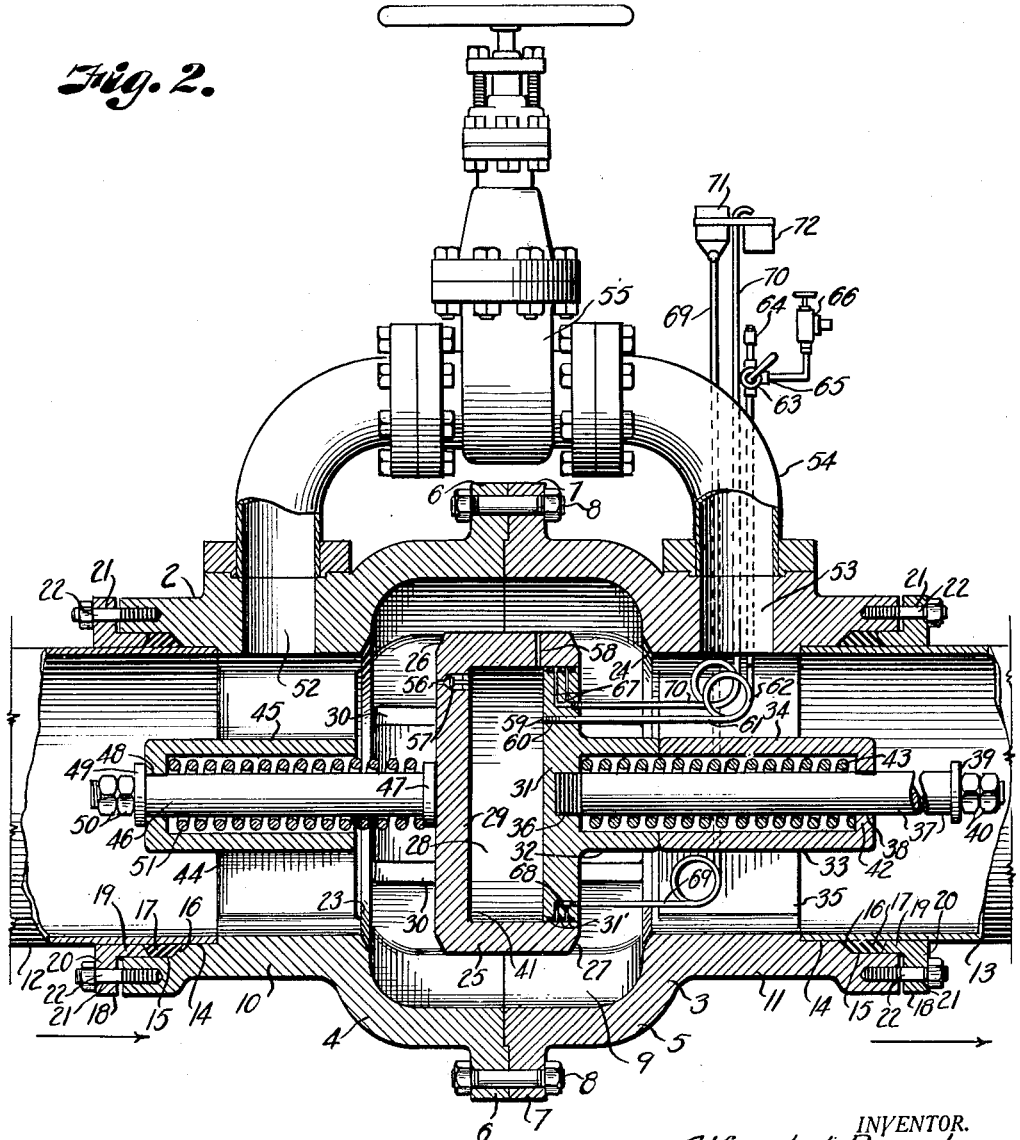
INVENTOR.
Alfred J. Diescher.
BY
ATTORNEY.

April 24, 1934.　　　A. J. DIESCHER　　　1,956,010
DOUBLE ACTING CHECK VALVE
Filed March 12, 1932　　2 Sheets-Sheet 2

INVENTOR.
Alfred J. Diescher.
BY
ATTORNEY.

Patented Apr. 24, 1934

1,956,010

UNITED STATES PATENT OFFICE 1,956,010

DOUBLE ACTING CHECK VALVE

Alfred J. Diescher, Winfield, Kans., assignor of one-half to M. L. R. Diescher, Winfield, Kans.

Application March 12, 1932, Serial No. 598,424

22 Claims. (Cl. 137—153)

This invention relates to check valves and more particularly to a double acting high pressure check adapted for use in fluid transportation lines, and has for its principal object to provide for automatic closure of the valves in case of a line break and to provide for quick opening thereof against line pressure after the break is repaired.

In accomplishing these and other objects of the invention, I have provided improved details of structure, the preferred form of which is illustrated in the accompanying drawings, wherein:

Fig. 1 is an elevational view of a portion of a gas transportation line equipped with double acting check valves constructed in accordance with my invention, illustrating a break in the line between the valves.

Fig. 2 is an enlarged detail sectional view through one of the check valves illustrating the valve parts in neutral position for flow through the line.

Figure 3:
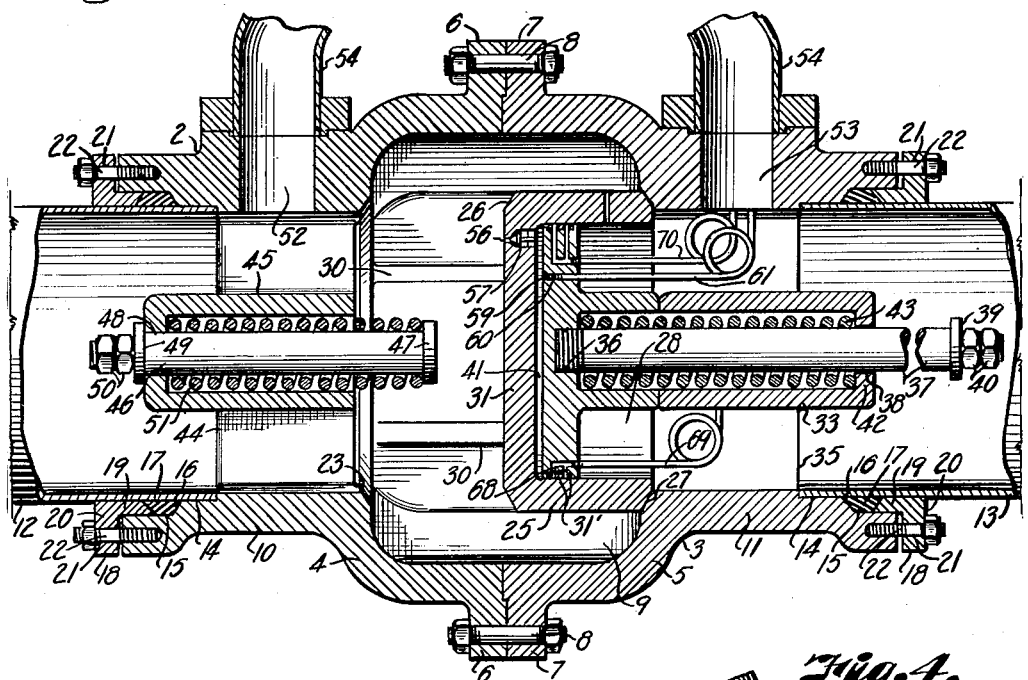
Fig. 3 is a similar view illustrating the valve check closing the outlet port as a result of a line break in the section of pipe on the outlet side of the valve.

Referring more in detail to the drawings:

1 designates a pipe line extending from a gas field to a distant market through which gas is transported under high pressure by means of compressor stations located at suitable intervals along the line.

Owing to the extremely high pressures carried in the line and to strains and stresses caused by expansion and contraction of the pipe, due to temperature changes, the lines are in constant danger of breakage at points between the compressor stations. Breakage of the pipe lines is extremely hazardous and not only results in loss of gas through the break, but seriously interferes in efficient operation of the compressors and loss of pressure in long sections of the line before the ordinary hand valves can be closed.

It is a purpose of this invention to automatically shut off flow through the sections of the line in which a break occurs so that the compressors in the line toward the field may continue to pack the gas into the portion of the line behind the break while the compressor stations toward the market may continue to draw gas from the portion of the line ahead of the break. Thus, unless the line break is extremely serious, there is sufficient gas in the portion of the line toward market to supply the market until the repair is completed, or until the gas can be diverted around the disrupted section of the line if detour lines are available.

As soon as the break is repaired, the gas packed in the section of the line toward the field is released into the depleted portion of the line to help compensate for the loss in the pressure toward market. There is, therefore, little or no interruption in the supply of gas at the market end. In accomplishing this result, I equip the pipe line at suitable intervals, for example every five miles, with an automatic self-closing check valve designated as 2, now described. Each of the valves are adapted to close in either direction and are of identical construction, so that only one need be described in detail.

As illustrated in Fig. 2, the valve includes a housing 3 comprising oppositely facing bell-shaped sections 4 and 5 having abutting peripheral flanges 6 and 7 that are secured together by suitable bolts 8 to form a valve check chamber 9. Extending outwardly from the respective bell-shaped sections and located in axial alignment therewith are tubular necks 10 and 11 having an inner diameter adjacent the chamber 9 substantially equal to the inner diameter of the pipe sections 12 and 13 between which the valve is connected. The outer ends of the neck portions 10 and 11 have a larger diameter, as at 14, to slidingly accommodate the ends of the pipe sections 12 and 13. The extreme outer ends of the necks are provided with internal annular recesses 15 to form packing seats 16 for retaining a compressible packing ring 17 that extends about the pipe and which is retained in sealing engagement therewith by a packing gland 18.

The packing glands 18 are sleeved over the ends of the pipe sections and comprise collars 19 having annular flanges 20 located in abutting alignment with the ends of the necks. The flanges are provided with openings 21 through which stud bolts 22 are extended to draw the collars against the packing rings to effect seals about the pipe, as in standard pipe construction.

Formed within the necks 10 and 11, adjacent their juncture with the check chamber, are oppositely facing bevelled check seats 23 and 24 to seat a check member 25, which is adapted to float therebetween and to engage either one of the seats in case of variation in pressure on opposite sides of the check to shut off flow through the valve.

The valve check member 25 comprises a cylindrical disk having bevelled edges 26—27 on its opposite faces conforming in shape and size to the valve seats 23 and 24, respectively. Provided within the check member is a cylindrical piston chamber 28 opening from the outlet side of the valve but terminating short of the inlet side to form a closed valve head 29 for shutting off flow from the check chamber into the pipe section 13 when the check engages the seat 24, and to shut off flow into the pipe section 12 when the check engages the seat 23. The check is retained and guided in its movement between the seats by spaced ribs 30 extending inwardly from the annular wall of the chamber and engaging against the periphery thereof to center the check within the housing and assure its proper position against either of the valve seats.

Slidable with the cylindrical chamber of the check is a piston 31 having a plurality of sealing rings 31' to prevent leakage of gas from the cylinder, as later described. Extending concentrically with the disk portion of the piston is a tubular boss 32 to abut against a spider 33 formed within the neck 11. The spider includes a central tubular hub portion 34 supported concentrically within the neck by integral radially extending arms 35. The piston is provided with a threaded socket 36 to secure the threaded end of a guide rod 37 which extends through the tubular boss and through a bearing opening 38 in the outer end of the hub of the spider. The rod extends through the opening a suitable distance to allow sufficient piston travel, and is provided with a stop washer 39 retained by lock nuts 40 to engage against the outer end of the spider and limit movement of the piston toward the head of the piston to leave a space 41 for a purpose later described.

Sleeved on the rod 37 and having one end engaging against the bottom of the socket 32 and its opposite end bearing against the end 42 of the spider hub 34 is a coil spring 43 for following the piston during its movement within the cylinder of the check and to form a shock absorber for the check when it engages the seat 24, as later described.

Formed in the other neck 10 is a similar spider 44 having a tubular hub portion 45 to slidably mount a similar rod 46. The rod is provided with a head 47 on its end adjacent the check, while its opposite end extends through a bearing opening 48 and carries a stop washer 49 retained by lock nuts 50 similar to the washer on the other rod previously described. Coiled about the rod is a spring 51 having one end engaging against the head and its opposite end against the end of the spider, to normally retain the valve check in neutral position, that is, in substantially central position within the chamber 9.

Formed in the upper portion of each neck 10 and 11 are radially extending ports 52 and 53, respectively, interconnected by a U-shaped conduit 54 having interposed therein a suitable valve 55, whereby gas may be by-passed about the valve when the valve is opened to effect equalization of pressures as hereinafter described.

In the construction thus far described, the springs 43 and 51 cooperating with the pressure in the cylinder retain the check member 25 and the piston 31 in the position illustrated in Fig. 2 when pressures on opposite sides of the valves are equal, so that gas may flow through the line.

In order to supply line pressure to the interior of the piston chamber 28, the head wall 29 thereof is provided with a port 56 adapted to be closed against pressure externally of the check by a valve 57 operable in response to pressure within the cylinder chamber, as later described.

When the valve parts are in neutral position, the pressure in the cylinder chamber is vented through a port 58 located in the periphery of the check and in substantial alignment with the forward face of the piston when the piston is in neutral position, but which is adapted to be closed upon movement of either the piston or the check member, as later described.

In order that external pressure may be applied to the interior of the cylinder, the piston 31 is provided with a port 59 to which is connected one of the terminals 60 of a flexible conduit 61 having its intermediate portion formed into a coil 62 to allow for travel of the piston, while the other terminal of the conduit extends through the valve housing and carries a three-way valve 63 having one branch connected with a suitable fitting 64, whereby external pressure may be admitted to the conduit upon opening of the valve 63 in the direction of the fitting. The pressure may be supplied by a small portable compressor or from bottled gas containers carrying the pressure required for operating the valve parts later described.

In order to allow release of pressure and to prevent the pressure in the cylinder chamber from building up beyond the pressure within the pipe line after the port 58 has been closed by the piston, the other outlet of the three-way valve is provided with a branch conduit 65 carrying a pressure relief or pop-off valve 66. The valve 63 is normally positioned to allow the pressure to escape through the poppet valve when the pressure in the piston chamber exceeds the normal pipe line pressure.

In order to lubricate the piston rings 31' to allow free movement of the piston in the cylinder, the piston is provided with radial ports 67 and 68 connected by conduits 69 and 70 with an oil supply chamber 71 and an oil receiver 72, respectively, that are located exteriorly of the valve so that oil may be supplied through the conduit 69 and delivered through the channels 67, and the surplus oil is returned through the conduit 70 for overflow into the receptacle 72.

The operation of a valve constructed and assembled as described is as follows:

During normal flow through the pipe line, the check valve member is retained in neutral position substantially midway between the valve seats 23 and 24 due to the resistance of the springs 43 and 51 and to the friction created by moving the relatively heavy valve parts, so that ordinary surges in the gas flow do not affect movement of the check member. Even should the valve float on the guides 30 between the valve seats, the valve will automatically return to neutral position when the side pressures are in, or nearly, balance.

Now assuming that a break occurs in a section of the pipe line between the valves 2a and 2b, as indicated at 73 in Fig. 1, and assuming that the direction of flow in the pipe line is in the direction as indicated by the arrow 74, an immediate drop in pressure occurs at the point of break causing greatly accelerated flow so that sudden surge of gas to expand through the outlet side of the valve 2a and correspondingly increased momentum of the flowing gas against the check member effects closure thereof against the seat 24, shutting off flow through the outlet side of the valve and preventing further escape of gas through the break from the section of the line toward the field, because pressure and velocity of the gas acting against the check member move the check member over the piston 31 which is normally retained against the fixed spider 35. As soon as the port 58 has closed, excess pressure in the piston chamber is relieved through the conduit 61, through the three-way valve 63 and pop valve 66, the pop-off valve 66 being set in substantially the normal working pressure of the line. The valve parts for the valve 2a are then in the position as indicated in Fig. 3.

When the break 73 occurs, the check member in the valve 2b is operated under pressure of the gas stored in the line ahead of the valve, which pressure likewise is released through the break, causing a reverse rush of gas from the outlet side of the valve 2b toward the inlet side of the valve which acts against the area of the piston and the periphery of the check member to move the check member against the seat 23, compressing the spring 51.

Figure 4:
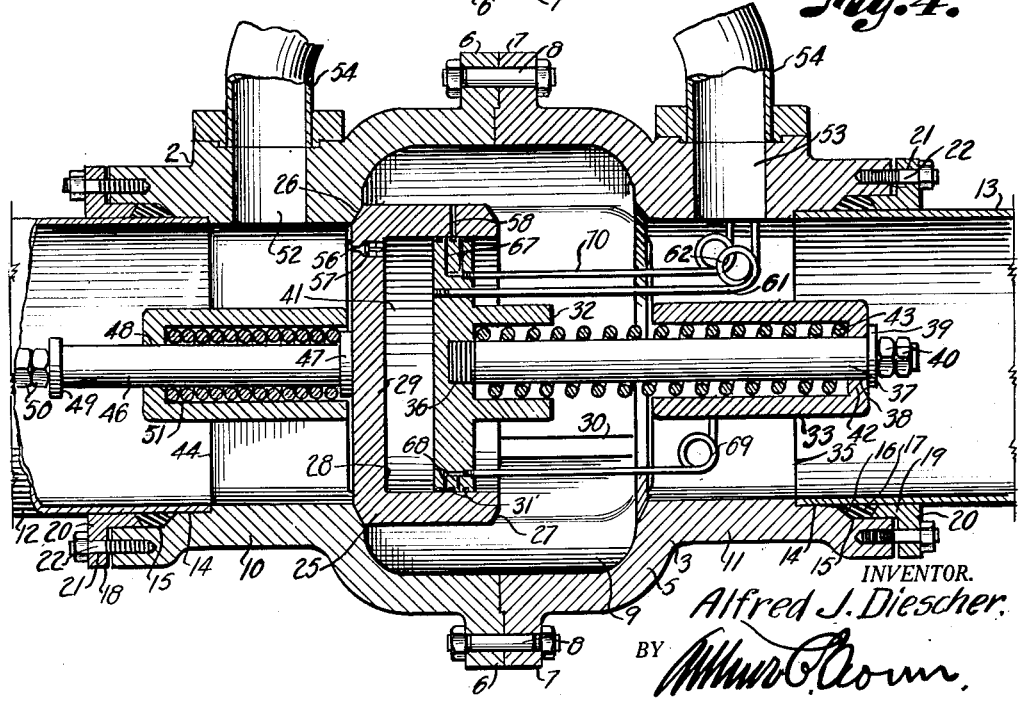
Fig. 4 is a similar view illustrating the valve check closing the inlet port as a result of a line break on the inlet side of the valve.

During movement of the check member, the piston is retained within the cylinder by the follow-up spring 43, as illustrated in Fig. 4. Movement of the piston closes the outlet valve 58 and seats the check valve 57, controlling the port 56 to entrap a gas pressure within the cylinder, which pressure is, of course, controlled by the previous seating of the pop-off valve 66. The moving parts of the valve 2b are then in the position as shown in Fig. 4, closing the inlet side of the valve and preventing further escape of gas rearwardly through the break.

After the break has been repaired, it is necessary to re-establish pressure within the repaired section of the line in order that the check members may be readily opened.

To effect equalization of pressures on opposite sides of the valves, the gate valve for the check 2a is slowly opened to allow the high pressure gas from the portion of the line in the direction of the field which has become packed by continued operation of the compressors to by-pass the check valve 2a and raise the pressure in the repaired section of the line. Due to continued withdrawal of gas by the compressor stations toward market, the pressure has dropped considerably in that section of the line. Therefore, pressure at the inlet side of the valve 2b soon exceeds the pressure tending to hold the valve closed. This excess pressure, aided by the spring 51, readily moves the check member in the valve 2b to its neutral position within the valve chamber.

This allows for release of pressure in the repaired section of the line and prevents building up of that pressure to a point where it can equalize at the inlet side of the valve 2a. Consequently, the check valve 2a is slow to respond, and to unseat this valve without full equalization of pressure, pressure must be applied between the piston and the check member to unseat it from the seat 24. This pressure may be provided by connecting a suitable portable compressor to the fitting 64 and opening the three-way valve for communicating the fitting with the conduit 61 to supplement the pressure which has been entrapped in the cylinder, so that the pressure therein may be increased sufficiently beyond the pressure of the gas acting against the inlet side of the check member to effect lifting of the check member from the seat 24. The valve may in time operate successfully due to expansion of the stored up pressure in the cylinder, but this requires some time because the pressures at the opposite faces of the valve must approach equalization. As soon as the valve 2a has opened, its by-pass is closed. This may be determined by suitable gauges located in the inlet and outlet sides which record that the pressures have equalized.

Attention is directed to the fact that the external pressure can be high enough to unseat the valve without waiting for substantial equalization across the two sides of the check. Also in the smaller sized valves and in lines operating on lower pressures, where practical external pressures could be provided, the check may be opened without opening the by-pass.

From the foregoing it is apparent that I have provided a valve construction that will successfully operate in either direction to shut off flow of gas in case of line breakage, and that the valve is readily re-opened against high pressures to re-establish flow after the break has been repaired. While I have illustrated one form of my invention, it is obvious that other methods may be provided in equalizing the pressures to effect operation of a floating check member, and I do not wish to be limited to the specific form of valve as illustrated in the drawings.

What I claim and desire to secure by Letters Patent is:

1. A double acting check valve of the character described including a housing having oppositely facing seats, a check member movable within the housing and adapted to engage either of said seats upon differential in pressure at opposite sides of the check member, and means arranged within said check member for establishing a differential internal pressure in said check member to effect unseating thereof.

2. A double acting check valve of the character described including a housing having oppositely facing seats, a check member movable within the housing and adapted to engage either of said seats upon sudden surge of fluid through the housing, springs for yieldingly retaining the check member in neutral position between said seats during normal flow through the valve, and means arranged within said check member for establishing a differential internal pressure in said check member to supplement said springs for effecting unseating thereof.

3. A double acting check valve of the character described including a housing having oppositely facing seats, a check member movable within the housing and adapted to engage either of said seats upon sudden surge of fluid through the housing, means for yieldingly retaining the check member in neutral position between said seats during normal flow through the valve, and means communicating with the check member to inject an external pressure medium into said check member for unseating said check member upon approximate equalization of pressures at opposite sides of said check member.

4. A double acting check valve including a housing having an inlet and an outlet provided with oppositely facing seats, a check member in the housing adapted to engage one of said seats in case of a sudden surge through the housing in the direction of said seat, means for yieldingly retaining the check member in neutral position between said seats, a by-pass for effecting approximate equalization of pressures at the inlet and outlet sides of the valve, and means for carrying pressure within the check member to effect unseating thereof when the pressures are substantially equalized through the by-pass.

5. In a gas line, a double acting check valve including a housing having an inlet and an outlet provided with check seats, a check member movable in response to difference in pressure within the housing to engage either of said seats and having a piston cylinder therein, a piston in the cylinder, a spring for moving the piston, means for admitting line pressure into said cylinder, a by-pass around said check member to effect approximate equalization of pressure on opposite sides of said member, and means for maintaining a constant pressure in said cylinder during movement of said check member under response to the pressure tending to seat said check member, whereby said pressure tends to restore said check to neutral position during equalization of pressures through the by-pass.

6. In a fluid transportation line, a double acting check valve including a housing having an inlet and an outlet provided with check seats, a check member movable in response to pressure differential at opposite ends of the housing to engage either of said seats and having a piston cylinder therein, a piston in the cylinder, means for admitting line pressure into said cylinder, whereby said pressure tends to unseat said check member, and a by-pass around said check member to reestablish equalization of pressure on opposite sides of said member to permit said cylinder pressure to unseat said check during equalization.

7. A double acting check valve including a housing having an inlet and an outlet provided with opposite facing seats, a check member in the housing and adapted to engage one of said seats in case of a sudden surge through the housing, a spring for retaining the check member in neutral position between said seats, a by-pass for reestablishing pressures at the inlet and outlet sides of the valve, and external means operable upon said check member to effect unseating thereof.

8. A double acting check valve including a housing having an inlet and an outlet provided with check seats, a check member movable in response to sudden abnormal surges within the housing to engage the seat in the direction of the surge and having a piston chamber therein, a piston in the cylinder, a valve in the check member for admitting high pressure fluid into the cylinder, whereby said fluid tends to unseat the check member, and a by-pass around said check member to effect equalization of pressure on opposite sides of said check member to permit said high pressure fluid to unseat said check.

9. A double acting check valve including a housing having an inlet and outlet provided with check seats, a check member movable in response to difference in pressure within the housing to engage either of said seats and having a piston cylinder therein, a piston in the cylinder, a spring controlling movement of the piston, a flexible conduit connected with the cylinder for admitting high pressure fluid to the cylinder tending to unseat said check member, and a by-pass around said check member to reestablish pressure on opposite sides of said member to permit said high pressure fluid to unseat said valve.

10. In a gas line, a double acting check valve including a housing having an inlet and outlet provided with check seats, a check member movable in response to difference in pressure within the housing to engage either of said seats and having a piston cylinder therein, a piston in the cylinder, a spring controlling movement of the piston, means for admitting line pressure into said cylinder, a flexible conduit connected with the cylinder for admitting high pressure fluid to the cylinder for supplementing the line pressure in said cylinder for effecting unseating of said check member, and a by-pass around said check member to effect increase of pressure on the low pressure side of said member to permit said high pressure fluid to unseat said member.

11. A check valve including a housing having an inlet and an outlet port provided with a check seat, a check member in the housing adapted to engage said seat in case of sudden drop in pressure at the outlet side of said housing and having a cylinder chamber therein, a piston in the chamber, means for admitting line pressure in the cylinder chamber from the inlet side of the housing, a by-pass communicating with the inlet and the outlet sides of said valve, and a valve in the by-pass whereby pressures may be reestablished at the outlet side of the valve to permit said cylinder pressure to unseat the check.

12. A check valve including a housing having an inlet and an outlet port provided with a check seat, a check member in the housing adapted to engage said seat in case of sudden drop in pressure at the outlet side of said housing and having a cylinder chamber therein, a piston in the chamber, means for admitting line pressure in the cylinder chamber from the inlet side of the housing, a by-pass communicating with the inlet and the outlet sides of said valve, a valve in the by-pass whereby pressures may be reestablished at the outlet side of the valve to permit said cylinder pressure to unseat the check, and means cooperating with said cylinder pressure to effect the immedaite unseating of said check.

13. A check valve including a housing having inlet and outlet ports provided with check seats, a check member movable in response to difference in pressure at opposite sides of the check member and having a cylindrical piston chamber therein, guide means in the housing supporting the check member in alignment with said seats, a piston in the piston chamber movable relatively to the check member, a guide fixed to the piston and slidable in the housing, means in the check member for automatically admitting pressure medium to the piston chamber to act against the piston to effect unseating of the check member when pressures are sufficiently equalized at opposite sides of the check member, and valve controlled means connected with the housing for reducing pressure differential at opposite sides of the check member to render said pressure medium effective for unseating the check member.

14. A check valve including a housing having inlet and outlet ports provided with check seats, a check member movable in response to difference in pressure at opposite sides of the check member and having a cylindrical piston chamber therein, guide means in the housing supporting the check member in alignment with said seat, a piston in the piston chamber movable relatively to the check member, a guide fixed to the piston and slidable in the housing, springs on the guide engaging the check member and the piston to retain said members in neutral position between said seats, means in the check member for automatically admitting pressure medium to the piston chamber to act against the piston to effect unseating of the check member when pressures are sufficiently equalized on opposite sides of the check member, and valve controlled means connected with the housing for reducing pressure differential at opposite sides of the check member to render said pressure medium effective for supplementing the springs.

15. A check valve including a housing having inlet and outlet ports provided with check seats, a check member movable in response to difference in pressure at opposite sides of the check member and having a cylindrical piston chamber therein, guide means in the housing supporting the check member in alignment with said seats, a piston in the piston chamber movable relatively to the check member and having a circumferential groove, a receptacle supported exteriorly of the valve for containing a supply of lubricant, a conduit having a flexible portion connecting the receptacle with said groove for supplying lubricant thereto, a guide fixed to the piston and slidable in the housing, means in the check member for automatically admitting pressure medium to the piston chamber to act against the piston to effect unseating of the check member when pressures are sufficiently equalized at opposite sides of the check member, and valve controlled means connected with the housing for reducing pressure differential at opposite sides of the check member to render said pressure medium effective for unseating the check member.

16. A double acting check valve of the character described including a housing having oppositely facing seats, a check member movable within the housing and adapted to engage either of said seats in response to surges of fluid through the housing, means for yieldingly retaining the check member in neutral position between said seats during normal flow through the housing, internal fluid pressure operated means within the check member for unseating said check member, and external means communicating with said check member for injecting an external fluid pressure medium to accelerate operation of said pressure operated means.

17. A double acting check valve of the character described including a housing having oppositely facing seats, a check member having an interior chamber and movable within the housing and adapted to engage either of said seats in case of surge of fluid through the housing, and means for yieldingly retaining the check member in neutral position between said seats during normal flow through the valve, and external fluid pressure operated means within the chamber of the check member unseating the check member against the pressure acting to seat said check member.

18. A check valve including a housing having an inlet and outlet port provided with a check seat, a check member in the housing having an interior chamber and engaging in the seat in response to surge of fluid through the housing, a by-pass communicating with the inlet and outlet sides of the housing, a valve controlling the by-pass to facilitate opening of said check, and means independent of the by-pass and communicating with the interior chamber of the check member for creating differential in pressure between the inside and outside of the check member to cause the same to unseat prior to equalization of pressures across the valve.

19. A double acting check valve of the character described including a housing having oppositely facing seats, a check member movable within the housing and adapted to engage either of said seats upon surge of fluid through the housing, means for yieldingly retaining the check member in neutral position between said seats during normal flow through the valve, and means arranged within said check member for establishing a differential internal pressure in said check member to supplement the yieldable means for effecting unseating of the check member.

20. A double acting check valve of the character described including a housing having oppositely facing seats, a check member having an interior chamber and movable within the housing and adapted to engage either of said seats in response to surges of fluid through the housing, means for yieldingly retaining the check member in neutral position between said seats during normal flow through the housing, internal fluid pressure operated means within the check member for unseating the check member, external means communicating with the interior chamber of said check member for injecting an external pressure medium therein to accelerate operation of said pressure operated means, and a valved by-pass communicating with the inlet and outlet sides of the housing for establishing pressures at opposite sides of the check member to assist in unseating thereof.

21. A valve including a housing having oppositely facing seats, check means movable within the housing and adapted to engage either of said seats in response to surges of fluid through the housing and including a pair of members forming a chamber interiorly of the check means and supported in the housing for independent movement relatively to each other in response to abnormal surge through the housing, means communicating with the interior chamber of the check means for admitting internal pressure medium between said members, and means for releasing said pressure medium from between said members through the housing.

22. A valve including a housing having oppositely facing seats, check means movable within the housing and adapted to engage either of said seats upon differential in pressure at opposite sides of the check means and including a pair of members supported in the housing for independent movement relatively to each other in response to abnormal surge through the housing by momentum of the surge acting directly against said check means to engage one of said seats, means communicating with the interior of the check means for admitting internal pressure between said members, and means communicating with the interior of the check means for establishing a differential internal pressure between said members to effect unseating of the check means.

ALFRED J. DIESCHER.